United States Patent [19]

Bekooij et al.

[11] Patent Number: 4,614,775

[45] Date of Patent: Sep. 30, 1986

[54] PREPARATION OF BINDERS FOR COATINGS, THERMOSETTING COATING COMPOSITIONS AND THEIR USE

[75] Inventors: Jurrianus Bekooij; Petrus G. Kooijmans; Werner T. Raudenbusch; Stephen A. Stachowiak, all of Amsterdam, Netherlands

[73] Assignee: Shell Oil Company, Houston, Tex.

[21] Appl. No.: 694,738

[22] Filed: Jan. 25, 1985

[30] Foreign Application Priority Data

Feb. 28, 1984 [GB] United Kingdom ................. 8405139

[51] Int. Cl.$^4$ .............................................. C08L 63/00
[52] U.S. Cl. ................................. 525/533; 204/181.6; 523/402; 523/424; 524/901; 528/112

[58] Field of Search ................ 525/533, 508; 528/112; 523/402

[56] References Cited

U.S. PATENT DOCUMENTS 2,908,664 10/1959 Belanger et al. .................... 525/533
4,105,614 8/1978 Davis et al. ...................... 525/533 X
4,128,515 12/1978 Tobias et al. ....................... 525/533

*Primary Examiner*—Theodore E. Pertilla

[57] ABSTRACT

The preparation of water-thinnable thermosetting resin binder compositions for coatings is described wherein a polyglycidyl ether prepared by reacting a multifunctional polyglycidyl ether with a monofunctional phenol is reacted with a dicarboxylic acid in the presence of an etherification catalyst.

11 Claims, No Drawings

PREPARATION OF BINDERS FOR COATINGS, THERMOSETTING COATING COMPOSITIONS AND THEIR USE

FIELD OF THE INVENTION

This invention relates to a process for the preparation of water-thinnable curable binders for coatings, to binders prepared by the process, to aqueous thermosetting coating compositions containing the binders and to the use of such compositions in coating articles.

BACKGROUND OF THE INVENTION

U.S. Pat. No. 4,246,089 discloses a glycidyl ether having on average less than one epoxy group per molecule, which is the reaction product of a bisphenol-A-derived diglycidyl ether and an alkyl phenol, e.g., nonyl phenol, in molar ratio in the range 1:1.1 to 1:1.9; and the use of such a glycidyl ether in preparing a graft copolymer based on an acrylic-amine backbone. Such graft copolymers are disclosed as components of thermosetting coating compositions, e.g., for electrocoating of vehicle bodies by cathodic electrodeposition.

U.S. Pat. No. 4,066,525 discloses the preparation of resinous binder materials containing substantially no residual epoxy groups by reaction of a bisphenol-A-derived diglycidyl ether with a phenol, e.g., nonyl phenol, or with a mixture of a phenol and an amino alcohol, e.g., diethanolamine. The resinous binder materials are used in thermosetting coating compositions for electrocoating of appliances by cathodic electrodeposition.

SUMMARY OF THE INVENTION

This invention is directed to a process for the preparation of a water-thinnable curable binder for coatings which comprises reacting together at a temperature in the range of from 6° to 170° C. and in the presence of an esterification catalyst, a polyglycidyl ether which is the reaction product of a multifunctional polyglycidyl ether and a monofunctional phenol, having 1 to 2 residual epoxy groups, a dicarboxylic acid and optionally a diglycidyl ether to provide a water-thinnable binder having an acid value in the range of at least 20 mg KOH/g and a content of incorporated monofunctional phenol in the range of from 5 to 40%w; to binders prepared by the process; thermosetting coating compositions containing them; and to the use of such compositions in the electrodeposition coating of articles.

DESCRIPTION OF PREFERRED EMBODIMENTS

The present invention is particularly directed to the preparation of stable-water-thinnable binders which comprises reacting a polyglycidyl ether, which is the reaction product of a multifunctional polyglycidyl ether and an alkyl phenol, with a dicarboxylic acid, to produce cured coatings having surprisingly enhanced flow and low porosity from said stable thermosetting coating compositions. Accordingly, the present invention is therefore directed to a process for the preparation of an essentially epoxy-free, carboxyl group-containing water-thinnable curable binder for coatings which comprises reacting together at a temperature in the range of from 60° to 170° C. and in the presence of an esterification catalyst (a) a polyglycidyl ether having on average n epoxy groups per molecule, where $1 < n \leq 2$, which comprises the reaction product of a multifunctional polyglycidyl ether having on average x epoxy groups per molecule, where $x > 2$, with (x-n) mol of a monofunctional phenol per mol of the multifunctional polyglycidyl ether and (b) a dicarboxylic acid.

The multifunctional polyglycidyl ether may conveniently be a polyglycidyl ether prepared by reaction of a polyhydric phenol having a phenolic hydroxyl functionality greater than 2, with an epihalohydrin, preferably epichlorohydrin, in the presence of a hydrogen halide acceptor, e.g., an alkali metal hydroxide.

Examples of suitable such polyhydric phenols are novolac resins of general formula

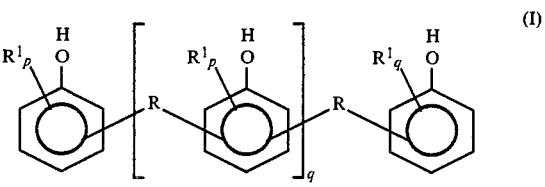

wherein R represents an alkylene, e.g., $CH_2$, group, $R^1$ represents an alkyl group, e.g., a methyl, p-t-butyl, octyl or nonyl group, q and p are numbers having average values $0 < q \leq 6$ and $0 \leq p \leq 2$, or of general formula,

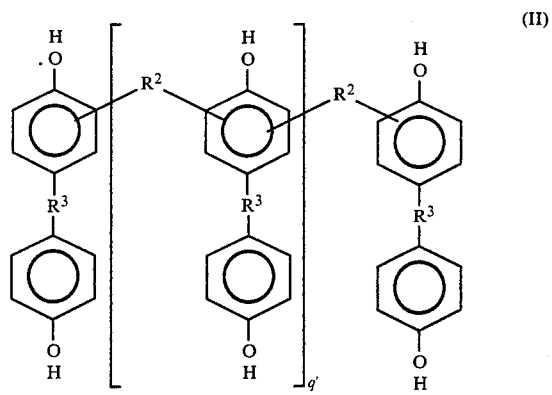

wherein $R^2$ represents an alkylene, e.g., $CH_2$, group, $R^3$ represents an alkylene, e.g., $CH_2$ or $C(CH_3)_2$ group, a carbonyl group, an oxygen or sulfur atom and q' is a number having an average value in the range 0 to 2.

Other examples of suitable polyhydric polynuclear phenols are 1,1-2,2-tetra(4-hydroxyphenyl)ethane and the tetraphenol derived from diphenolic acid having the general formula

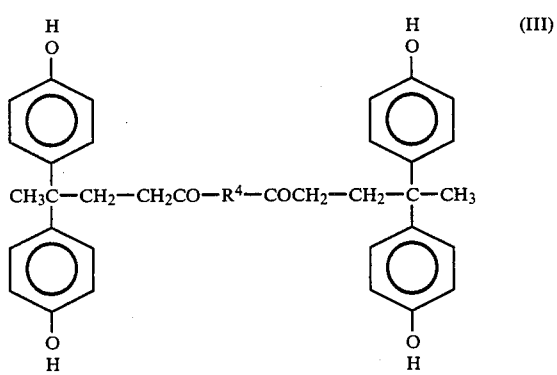

wherein $R^4$ represents the residue of a diol. Polyglycidyl ethers derived from polyhydric phenols of formulae I, II and III are known and are described, together with processes for their preparation. See, for example, U.S. Pat. No. 2,844,553.

Preferably, the multifunctional polyglycidyl ether is an epoxy novolac resin wherein x is greater than 2 and is in the range from 2 to 6, and more preferably x is in the range from 3 to 4.

Advantageously the epoxy novolac resin is derived from a novolac of formula I wherein R is $CH_2$, q is 1 to 2 and p is 0 to 1 or a bisphenol novolac of formula II wherein $R^2$ is $CH_2$, $R^3$ is $C(CH_3)_2$ and $q'$ is 0.

Preferably n is in the range of from about 1.3 to about 2.

The monofunctional phenol may be a single phenol or a mixture of phenols. For example the phenol may conveniently be phenol optionally substituted by one or more of one or more substituents selected from $C_{1-16}$ alkyl, $C_{3-16}$ alkenyl, $C_{1-4}$ hydroxyalkyl, $C_{2-13}$ alkoxycarbonyl and $C_{1-16}$ alkoxy groups. Examples of such compounds include phenol, the cresols, salicyl alcohol, 2-allyl phenol, 2,4,6-triallyl phenol, dimethyl phenol, 4-hydroxymethyl-2,6-dimethyl phenol, 2-hydroxyphenethyl alcohol, 4-hydroxybenzyl alcohol and ethyl 4-hydroxybenzoate. Preferably the monofunctional phenol is phenol substituted in the para-position by a $C_{4-12}$ alkyl substituent. Examples of such alkyl substituents include n-, iso- and t-butyl, n- and iso-octyl, n- and iso-nonyl and n- and iso-dodecyl groups. Branched alkyl substituents are particularly suitable. 2(1,1-3,3-tetramethyl-butyl)phenol has been found to be a very suitable monofunctional phenol.

The polyglycidyl ethers may conveniently be prepared by reacting the multifunctional polyglycidyl ether with the monofunctional phenol at a temperature in the range from about 120° to 180° C. in the presence of an acid or base catalyst.

Preferably, the reaction is at a temperature from about 130° to 150° C.

The acid or base catalyst may be, for example, a tertiary amine, a quaternary ammonium or phosphonium salt or an alkali metal hydroxide or carbonate, or sulfuric acid.

The tertiary amine may be, for example, triethanolamine, benzyl dimethylamine or 2-dimethylamino-2-methyl-1-propanol. Quaternary ammonium salts, e.g., tertiary ammonium chloride, are preferred catalysts.

Tertiary amine catalysts are preferably used in amounts from 0.1 to 1%w of reactants and quaternary ammonium salts are preferably employed in amounts from 0.005 to 0.2%w of reactants.

The dicarboxylic acid may conveniently be an aliphatic dicarboxylic acid. Examples of such compounds include succinic acid, maleic acid, glutaric acid, itaconic acid, adipic acid, pimelic acid, suberic acid, azelaic acid, sebacic acid, 1,12-dodecanedioic acid, dodecenyl succinic acid, noneyl succinic acid, dimerized fatty acid.

Another class of dicarboxylic acids which may conveniently be used are those obtained by partial esterification or amidation of a polycarboxylic acid or a polycarboxylic acid anhydride. Examples of such compounds include the monoalkyl esters of trimellitic anhydride and the dialkylesters of pyromellitic anhydride. Preferably, these alkyl esters are derived from primary alkanols having at least 6 carbon atoms. Further examples of these ester type dicarboxylic acids can, for example, be obtained by partial esterification or amidation of the reaction product of 2 moles of trimellitic anhydride and 1 mole of an aliphatic diol.

Preferred dicarboxylic acids are those having water solubility below 0.3 g/100 g water of 20° C. Azelaic acid and sebacic acid have been found to be very suitable dicarboxylic acids.

It will be appreciated by those skilled in the art that the ultimate reaction product of the reaction between the dicarboxylic acid and the polyglycidyl ether will be an essentially linear molecule. In order to be potentially water soluble or water dispersible after neutralization and furthermore in order to be essentially free of epoxy groups this molecule should have on average a carboxyl group at each end and an acid value in the range of at least 20 mg KOH/g. To this end the dicarboxylic acid and the glycidyl ether compounds should be reacted in such amounts that there is an excess of 2 equivalents of acid over the total equivalents of epoxy. When the water-thinnable binder is used in compositions which will be applied by an electrodeposition process, the acid value should not be too high for process technical reasons. In other words, for such an application it is preferred that the acid value of the water soluble binder be in the range of from about 20 to 80 mg KOH/g. Most preferably, the acid value should be in the range of from 30 to 5 mg KOH/g.

If desired a quantity of a known liquid or solid diglycidyl ether, may be included with the above polyglycidyl ether in the reaction with the dicarboxylic acid in the above process for preparing a water-thinnable binder.

The diglycidyl ether is preferably a diglycidyl ether of a dihydric phenol, e.g. a bisphenol. Conveniently the diglycidyl ether is a diglycidyl ether of 2,2-bis(4-hydroxyphenyl)propane having a weight per epoxide (WPE) in the range 170 g to 1500 g. Preferably, the diglycidyl ether has a WPE in the range from about 400 g to 1100 g. Examples of very suitable diglycidyl ethers of 2,2-bis(4-hydroxyphenyl)propane include the commercially available EPON ® Resin 1001 (WPE of about 450 g to 500 g) and EPON ® Resin 3003 (WPE of about 725 g to 825 g).

The amount of diglycidyl ether which can optionally be co-reacted with the dicarboxylic acid and the polyglycidyl ether is determined by the amount of monofunctional phenol which has to be incorporated in order to achieve the aforementioned improvements. Coatings with improved flow and reduced porosity can be obtained when the amount of monofunctional phenol incorporated in the ultimate water-thinnable binder is in the range of from 5 to 40%w. Preferably the amount of monofunctional phenol is in the range of from 10 to 25%w.

In the preparation of the water-thinnable binder, which is conducted at a temperature in the range of 60° to 170° C., reaction between aliphatic hydroxyl groups and epoxy groups or carboxyl groups should be avoided. This may be achieved by employing a tertiary amine, e.g., 2-dimethylamino-2-methyl-1-propanol, as catalyst for the reaction of epoxy groups with carboxyl groups.

Tertiary amine catalysts are preferably used in amounts from about 0.1 to 1%w of reactants. Preferably, the reaction between the dicarboxylic acid and the glycidyl ether is conducted at a temperature in the range of from about 100° to 150° C.

The invention further provides binders prepared by the process of the invention and also aqueous thermosetting coating compositions comprising (A) a binder prepared by the process of the invention and (B) a crosslinking compound in a solids weight ratio A:B in the range from about 95:5 to 60:40, preferably 85:15 to 65:35, more preferably, 85:15 to 75:25. The thermosetting coating compositions are prepared by combining the binder with the cross-linking compound before or after neutralization. The invention also specifically provides use of a thermosetting coating composition of the invention in electrodeposition of articles (anodic electrodeposition).

Preferred crosslinking compounds, for addition to the binder compounds before of after neutralization, are water-soluble crosslinking agents of the aminoplast type, such as alkoxylated reaction products of formaldehyde with melamine or benzoguanamine.

Other crosslinking compounds include urea-formaldehyde resins, phenol-formaldehyde resins, and block polyisocyanates.

Pigments, fillers, dispersing agents, and other components known in the art of paint formulation may further be added. Addition of small amounts (up to 1%w) of non-ionic surfactant may be useful for further stabilization of aqueous compositions or improvement of the wetting during application. Co-solvents, such as 2-n-butoxyethanol and, especially, 2-n-hexyloxyethanol, may advantageously be included. The water for use in the aqueous compositions is preferably purified, such as by distillation or demineralization. The water-dilutable compositions may be applied by a variety of methods known in the art, onto a variety of substrates, in particular metals such as bare steel, phosphated steel, chromate-treated steel, zinc, tin plate (for can coating), and aluminum (also e.g. for can coating), to produce cured coatings of desirable thickness, from 2 micrometers upwards up to in general 40 micrometers.

Curing can be performed by stoving, for example, at temperatures from 150° to 220° C., with curing times varying from 2 to 30 minutes.

The thermosetting coating compositions may generally be applied by electrodeposition and other methods such as spraying or dipping, and are particularly suitable for coating cans by electrodeposition. Those skilled in the art will appreciate the need to select compounds which are approvable by regulatory authorities when food or beverage cans are to be coated.

The invention will be further understood from the following illustrative examples, in which parts and percentages are by weight, unless otherwise indicated, and various terms are defined as follows:

"Multifunctional polyether A" is a semi-solid multifunctional epoxy novolac resin of average molecular weight 665 g, containing on average 3.5 epoxy groups per molecule.

"Polyether D" is a solid diglycidyl ether of 2,2-bis(4-hydroxyphenyl)propane of a WPE of about 485, containing on average 1.85 epoxy groups per molecule.

CYMEL 1141 (trademark) is a highly alkylated melamine-formaldehyde curing resin containing methoxy and isobutoxy substituents and acidic chelating groups, 85% solids in isobutanol, AV 22±3 mg KOH/g.

EXAMPLE 1

Adduct for use as anodic electrodeposition binder (a) Preparation of reaction product of multifunctional polyglycidyl ether with monofunctional phenol Multifunctional polyether A (665 g, 1 mol, 3.5 epoxy equivalents) and p-(1.1.3.3-tetramethyl-butyl)phenol (309 g, 1.5 mol) were heated with stirring to 140° C. When the mixture was homogeneous, a 50%w aqueous solution of tetramethylammonium chloride (1 g) was added and the mixture was maintained at 140°-150° C. until the reaction was complete (4 hours). The resulting product having an epoxy content of 2.05 meq/g solids (average 2 epoxy equivalents per molecule) and a residual phenolic hydroxyl content of 0.01 meq/g solids.

(b) Preparation of adduct for use as anodic electrodeposition binder

Polyether D (1940 g, 4 epoxy equivalents) was added to the reaction product of step (a) and heated at 140° C. until the mixture was homogeneous. Subsequently azelaic acid (752 g, 4 mol, 8 acid equivalents) and 2-dimethylamino-2-methyl-1-propanol (5 g) were added and the mixture was heated to 140°-150° C. with stirring and kept at this temperature for a further 6 hours, until the reaction was complete. The resulting binder, which had an epoxy content of 0.02 meq/g solids and an acid value of 31 mg KOH/g, was allowed to cool to 120° C., whereupon it was diluted with 2-n-butoxyethanol (916 g), resulting in a clear viscous solution having a solids content of 80%w; the ultimate binder had an incorporated alkylphenol content of 8.4%w.

EXAMPLE 2

Adduct for use as anodic electrodeposition binder

Twice the amount of the reaction product of Example 1(a) (i.e. 1948 g, 4 epoxy equivalents), 970 g of polyether D (2 epoxy equivalents) and 752 g azelaic acid (4 mol, 8 acid equivalents) were reacted in the presence of 2-dimethylamino-2-methyl-1-propanol following the procedure described in Example 1(a). 987 g of 2-n-butoxyethanol was used to dilute the resulting binder (acid value 32 mg KOH/g), which resulted in a clear viscous solution having a solids content of 78.8%w.

The ultimate reaction product had an incorporated alkylphenol content of 16.8%w.

EXAMPLE 3

Adduct for use as anodic electrodeposition binder (a) Preparation of reaction product of multifunctional polyglycidyl ether with monofunctional phenol Multifunctional polyether A (665 g, 1 mol, 3.5 epoxy equivalents) and p-tertiary butyl phenol (300 g, 2 mol) were heated with stirring to 140° C. When the mixture was homogeneous, a 50%w aqueous solution of tetramethylammonium chloride (1 g) was added and the mixture was maintained at 140°-150° C. until the reaction was complete (4 hours). The resulting product had an epoxy content of 1.57 meq/g solids (average 1.51 epoxy equivalents per molecule).

(b) Preparation of adduct for use as anodic electrodeposition binder

The reaction product of 3(a) (965 g, 1.5 epoxy equivalents) was reacted with sebacic acid (253 g, 1.25 mol, 2.5 acid equivalents) in the presence of 2.5 g 2-dimethylamino-2-methyl-1-propanol following the procedure described in Example 1(b). The ultimate binder (acid value 48 mg KOH/g) was diluted with 304 g of 2-n-butoxyethanol to give a clear viscous solution having a solids content of 80%w. The incorporated alkylphenol content of the ultimate binder was 24.6%w.

EXAMPLE A (comparative)

Adduct for use as anodic electrodeposition binder

Polyether D (1940 g, 4 epoxy equivalents) was reacted with azelaic acid (564 g, 3 mol, 6 acid equivalents) in the presence of 6 g of 2-dimethylamino-2-methyl-1- propanol under the conditions as described in Example 1(b) to arrive at a binder having an acid value of 43.8 mg KOH/g solids and no residual epoxy functionality. This product was diluted with 628 g of 2-n-butoxyethanol to arrive at a viscous solution having a solids content of 79.9%w.

EXAMPLE B (comparative)

Adduct for use as anodic electrodeposition binder (1) Preparation of reaction product of multifunctional polyglycidyl ether with monofunctional phenol 665 g of Multifunctional polyether A (1 mol, 3.5 epoxy equivalents) was reacted with 412 g of p-(1,1-3,3-tetramethylbutyl)phenol (2 mol) resulting in a reaction having an epoxy content of 1.35 meq/g (average 1.46 epoxy equivalents per molecule) and a phenolic hydroxyl content lower than 0.01 meq/g. This product was diluted with 555 g of 2-n-butoxyethanol to arrive at a solution having a solids content of 66%w.

(2) Preparation of adduct for use as anodic electrodeposition binder

Glycine (54.7 g, 0.73 mol), water (150 g) and potassium hydroxide (46.9 g, 0.73 mol) were heated with stirring to 100° C. The reaction product of step (1) (1633 g of a 66%w solution in 2-n-butoxyethanol, 1 mol polyether product) was added slowly, with stirring over a period of 4 hours while maintaining the temperature of 100° C. Upon completion of the addition the mixture was stirred at 100°–110° C. for a further hour. The final product was a clear viscous solution, in which no epoxy groups could be detected. Subsequently this solution in 2-n-butoxyethanol was diluted with the addition of 5848 g demineralized water with stirring to arrive at a solution having a solids content of 15%w.

To 1000 g of this solution was added 80 g of an ion exchange resin, "Dualite C-26 TR" (registered trade name),—a sulfonated styrene-divinylbenzene copolymer containing 8% crosslinks—which had previously been neutralized with 2-dimethylamino-2-methyl-1-propanol, to result in an ion exchange resin having a loading of 1.9 meq 2-dimethylamino-2-methyl-1-propanol/g of wet resin. The mixture was stirred at room temperature for 6 hours whereupon the spent ion exchange resin was filtered off and the same procedure repeated with a further 80 g of the 2-dimethylamino-2-methyl-1-propanol containing ion exchange resin.

The final ion exchanged solution was clear, had a solids content of 14.5%w and contained less than 2 ppm potassium on solution.

EXAMPLES 4–6

Anodic electrodeposition composition

The adducts of Examples 1–3, in the form of the respective solutions in 2-n-butoxyethanol obtained in those Examples, were blended with CYMEL 1141 in binder solids to CYMEL 1141 weight ratio 70:30 and subsequently further diluted with 2-n-hexyloxyethanol, to arrive at solutions having a solids content of 76%w, neutralized with a 90% equivalent amount of 2-dimethylamino-2-methyl-1-propanol and diluted by gradual addition of demineralized water to a final solids content of 15.5%w.

EXAMPLE C (comparative)

Anodic electrodeposition composition

The adduct of Example A, in the form of its solution in 2-n-butoxyethanol, as obtained in said Example was processed following the procedure of Examples 4–6.

EXAMPLE D (comparative)

Anodic electrodeposition composition

The solution of the ion exchanged adduct as obtained in Example B was blended with CYMEL 1141 in a binder solids to CYMEL 1141 weight ratio 70:30 and was stirred at room temperature for 48 hours before use.

EXAMPLES 7–9

Use of anodic electrodeposition compositions in can coating

The coating compositions of Examples 4 to 6 were used to coat 330 ml tin-plate cans by anodic electrodeposition. The can formed the anode of an electrodeposition cell, the cathode being a stainless steel member inserted within the can at a substantially uniform separation of 2 millimeters from the can. A potential difference, which would result after baking in a coating weight per can in the range of 180 to 220 mg corresponding with a dry film thickness in the range of 6 to 7 mm, was applied between the can and the cathode, for a total time of 400 milliseconds. After electrodeposition the coated can was vigorously rinsed with demineralized water, and the coating was cured by stoving the coated can for 5 minutes at 200° C.

After curing and measuring coating weight, porosity was tested by using an electrolyte solution containing a red indicator (6.2 V for 30 sec). Subsequently the cans were filled with a second clear electrolyte solution. The areas of the can not covered by the coating, became red. Using this method it is easy to identify pores or other coating defects.

For comparative reasons similar experiments were conducted with compositions of Examples C and D. Results are given in Table I following, in which solvent resistance is expressed in terms of "MEK rubs", i.e., the number of double rubs with a methylethylketone-moistened cloth necessary to remove the coatings, while the film appearance (flow) is expressed as a numerical rating resulting from a visual assessment (5: smooth surface, excellent flow, no defects, 4: orange-peel type surface; 3: orange-peel type surface and few bubbles and/or pinholes, 2: many bubbles and/or pinholes).

The sterilization resistance of the coatings was determined by exposure to water at 121° C. for 90 minutes and rated according to a numerical scale ranging from 5: no blushing to 0: very heavy blushing.

TABLE I

| Example | Composition | Alkylphenol incorporated (% w) | Application voltage (V) | Coating weight (mg) | Film appearance (flow) | Porosity (mA) | Mek rubs | Sterilization resistance |
| --- | --- | --- | --- | --- | --- | --- | --- | --- |
| 4 | 4 | 8.4 | 90 | 210 | 4–5 | 1.0 | >100 | 5 |
| 5 | 5 | 16.8 | 100 | 215 | 5 | 0.2 | >100 | 5 |
| 6 | 6 | 24.6 | 100 | 205 | 5 | 0.8 | >100 | 4–5 |
| Comparative | C | 0 | 110 | 195 | 5 | 70 | >100 | 4–5 |

TABLE I-continued

| Example | Composition | Alkylphenol incorporated (% w) | Application voltage (V) | Coating weight (mg) | Film appearance (flow) | Porosity (mA) | Mek rubs | Sterilization resistance |
|---|---|---|---|---|---|---|---|---|
| Comparative | D | 35.5 | 75 | 210 | 3 | 115 | >100 | 4–5 |

The use of the binder composition of Examples 4 to 6 results in coatings which all exhibit excellent properties, and significantly better flow and/or reduced porosity compared to those of Examples C and D.

What is claimed is:

1. A process for the preparation of an essentially epoxy-free, carboxy group-containing, water-thinnable curable binder for coatings which comprises reacting together at a temperature from about 60° to about 170° C. and in the presence of an esterification catalyst which promotes the selective reaction of epoxy groups with carboxyl groups (a) a polyglycidyl ether having, on average, n epoxy groups per molecule, where $1 \leq n < 2$, which comprises the reaction product of a multifunctional polyglycidyl ether having, on average, x epoxy groups per molecule, where $x > 2$, with (x-n) mol of a monofunctional phenol per mol of the multifunctional polyglycidyl ether and (b) a dicarboxylic acid in an amount and under conditions effective for reacting essentially all the n epoxy groups per molecule with the dicarboxylic acid and producing a reaction product of (a) and (b) having an acid value in the range of about 20 to about 80 mg KOH/g.

2. The process of claim 1 wherein the polyglycidyl ether is derived from a multifunctional polyglycidyl ether which is an epoxy novolac resin wherein $3 \leq x \leq 4$.

3. The process of claim 1 wherein, in the polyglycidyl ether, $1.3 \leq n \leq 2$.

4. The process of claim 1 wherein the monofunctional phenol from which the polyglycidyl ether is derived is phenol substituted in the para-position by a $C_{4-12}$ alkyl substituent.

5. The process of claim 1 wherein the dicarboxylic acid has a water solubility below 0.3 g/100 g water at 20° C.

6. The process of claim 1 wherein the dicarboxylic acid is reacted with a mixture of the polyglycidyl ether and a diglycidyl ether.

7. The process of claim 6 wherein the diglycidyl ether is a diglycidyl ether of 2,2-bis(4-hydroxyphenyl)propane having a weight per epoxide of about 170 g to 1500 g.

8. The process of claim 1 wherein the water-thinnable curable binder has a content of incorporated monofunctional phenol from about 10 to 25%w.

9. The process of claim 1 wherein the water-thinnable curable binder has an acid value of from about 30 to 50 mg KOH/g.

10. A binder prepared by the process of claim 1.

11. The process of claim 1 wherein the esterification catalyst is a tertiary amine.

* * * * *